United States Patent
Koet et al.

(10) Patent No.: US 11,203,449 B2
(45) Date of Patent: Dec. 21, 2021

(54) SYSTEM AND METHOD FOR AUTOMATING PACKAGING OF VARYING SHIPMENT SETS

(71) Applicant: QUADIENT TECHNOLOGIES FRANCE, Bagneux (FR)

(72) Inventors: Anne Koet, Drachten (NL); Reint Smit, Drachten (NL); Joost Zeilstra, Drachten (NL)

(73) Assignee: QUADIENT TECHNOLOGIES FRANCE, Bagneux (FR)

( * ) Notice: Subject to any disclaimer, the term of this patent is extended or adjusted under 35 U.S.C. 154(b) by 99 days.

(21) Appl. No.: 15/885,124

(22) Filed: Jan. 31, 2018

(65) Prior Publication Data

US 2018/0215485 A1 Aug. 2, 2018

(30) Foreign Application Priority Data

Jan. 31, 2017 (DE) ..................... 10 2017 101 918.9

(51) Int. Cl.
*B65B 5/06* (2006.01)
*B65B 43/10* (2006.01)
(Continued)

(52) U.S. Cl.
CPC ............... *B65B 5/06* (2013.01); *B65B 5/024* (2013.01); *B65B 7/28* (2013.01); *B65B 7/2864* (2013.01);
(Continued)

(58) Field of Classification Search
CPC .. B65B 5/06; B65B 5/08; B65B 5/105; B65B 43/08; B65B 57/10; B65B 57/12;
(Continued)

(56) References Cited

U.S. PATENT DOCUMENTS

| 5,991,041 | A | * | 11/1999 | Woodworth | ........... | G01B 11/04 |
| | | | | | | 356/602 |
| 6,510,670 | B1 | * | 1/2003 | Janhonen | ................ | B65B 25/14 |
| | | | | | | 53/209 |

(Continued)

FOREIGN PATENT DOCUMENTS

| EP | 2 891 433 | 7/2015 |
| WO | 2013/117852 | 8/2013 |

(Continued)

OTHER PUBLICATIONS

Extended European Search Report, dated Sep. 12, 2017, for European Application No. 17159019.3-1708, 7 pages.

*Primary Examiner* — Thanh K Truong
*Assistant Examiner* — David G Shutty
(74) *Attorney, Agent, or Firm* — Cozen O'Connor

(57) ABSTRACT

A system for automating packaging of varying shipment sets comprises a control unit for receiving from a database stored information on the size and number of items forming a shipment set according to a dispatch order, an information acquiring device for acquiring current information on the items being actually arranged for said shipment set, said information acquiring device being communicatively coupled with said control unit and said control unit being configured to calculate, either based on the information from said database or from the information acquiring device, the dimensions of a custom sized cardboard box for packaging the shipment set, a box forming station for forming said custom sized cardboard box having a bottom wall, four side walls and an open top, a packaging station for packaging the items forming the shipment set into said custom sized cardboard box, and a lid placing station for closing said custom sized cardboard box with an appropriate lid, wherein said control unit is configured for performing a verification using the current information from said information acquir- (Continued)

ing device and the stored information from said database to verify that the actual shipment set is formed according to the dispatch order.

10 Claims, 4 Drawing Sheets

(51) Int. Cl.
| | | |
|---|---|---|
| *B65G 1/137* | (2006.01) | |
| *G06T 7/62* | (2017.01) | |
| *B65B 5/02* | (2006.01) | |
| *B65B 7/28* | (2006.01) | |
| *B65B 61/26* | (2006.01) | |
| *B65B 59/02* | (2006.01) | |
| *B65B 65/00* | (2006.01) | |
| *B65B 59/00* | (2006.01) | |
| *G06Q 10/08* | (2012.01) | |

(52) U.S. Cl.
CPC ............ *B65B 7/2871* (2013.01); *B65B 43/10* (2013.01); *B65B 59/001* (2019.05); *B65B 59/003* (2019.05); *B65B 59/02* (2013.01); *B65B 61/26* (2013.01); *B65B 65/006* (2013.01); *B65G 1/1378* (2013.01); *G06Q 10/087* (2013.01); *G06T 7/62* (2017.01); *B65B 2210/04* (2013.01); *G05B 2219/45048* (2013.01)

(58) Field of Classification Search
CPC ... B65B 61/025; B65B 61/20; B65B 2210/04; B65G 1/1378; G06T 7/62
USPC .......... 53/128.1, 131.3, 247, 28.5, 396, 410, 53/411, 456, 504, 558, 564
See application file for complete search history.

(56) References Cited

U.S. PATENT DOCUMENTS

| | | | | |
|---|---|---|---|---|
| 6,615,104 | B2* | 9/2003 | England | G06Q 10/00 53/201 |
| 6,721,762 | B1* | 4/2004 | Levine | G06Q 10/04 |
| 7,104,453 | B1* | 9/2006 | Zhu | G06K 7/10861 235/462.14 |
| 7,275,693 | B2* | 10/2007 | Good | G02B 26/106 235/454 |
| 7,357,327 | B2* | 4/2008 | Odenthal | B07C 3/10 235/472.01 |
| 7,492,973 | B2* | 2/2009 | Cato | G06K 7/10851 382/312 |
| 7,823,367 | B2* | 11/2010 | Boigues | B65B 5/02 53/456 |
| 8,401,975 | B1* | 3/2013 | Tian | G06Q 10/08 705/335 |
| 8,939,369 | B2* | 1/2015 | Olmstead | G06K 7/10445 235/438 |
| 9,821,925 | B2* | 11/2017 | Yamazaki | B65B 5/02 |
| 9,828,128 | B1* | 11/2017 | Linnell | B65B 59/003 |
| 10,055,626 | B2* | 8/2018 | Beghtol | G06K 7/10861 |
| 10,402,890 | B2* | 9/2019 | Pettersson | G06Q 30/0635 |
| 10,940,965 | B2* | 3/2021 | Sytema | B65D 25/06 |
| 2005/0173527 | A1* | 8/2005 | Conzola | G07G 1/0054 235/385 |
| 2008/0020916 | A1* | 1/2008 | Magnell | G01B 11/043 493/65 |
| 2009/0031676 | A1* | 2/2009 | Boigues | B65B 5/02 53/491 |
| 2011/0308204 | A1* | 12/2011 | Corradi | B65B 57/14 53/472 |
| 2013/0000252 | A1* | 1/2013 | Pettersson | B65B 59/001 53/396 |
| 2014/0059881 | A1 | 3/2014 | Pettersson | |
| 2014/0059981 | A1* | 3/2014 | Pettersson | B65B 5/024 53/504 |
| 2014/0067104 | A1* | 3/2014 | Osterhout | G06Q 50/28 700/97 |
| 2014/0244026 | A1* | 8/2014 | Neiser | B65G 1/1378 700/216 |
| 2014/0291112 | A1* | 10/2014 | Lyon | B65G 1/1378 198/341.01 |
| 2015/0360433 | A1* | 12/2015 | Feijen | B31B 50/74 53/456 |
| 2015/0360801 | A1* | 12/2015 | Sytema | B65B 43/10 53/74 |
| 2015/0367974 | A1* | 12/2015 | Sytema | B65B 57/12 53/461 |
| 2016/0272354 | A1* | 9/2016 | Nammoto | B25J 9/0087 |
| 2017/0210500 | A1* | 7/2017 | Sytema | B65B 11/004 |
| 2017/0217620 | A1* | 8/2017 | Zeilstra | G05B 19/402 |
| 2018/0016043 | A1* | 1/2018 | Yokota | B65B 5/06 |
| 2018/0022493 | A1* | 1/2018 | Lamb | B31B 50/94 700/103 |
| 2018/0134421 | A1* | 5/2018 | Ponti | B65D 43/20 |

FOREIGN PATENT DOCUMENTS

| | | |
|---|---|---|
| WO | 2014/117817 | 8/2014 |
| WO | 2015/124869 | 8/2015 |
| WO | 2016/053747 | 4/2016 |
| WO | 2016/059218 | 4/2016 |
| WO | 2016/157089 | 10/2016 |

* cited by examiner

SYSTEM AND METHOD FOR AUTOMATING PACKAGING OF VARYING SHIPMENT SETS

TECHNICAL FIELD OF THE INVENTION

The application relates to a system and a method for automating the packaging of varying shipment sets, i.e. sets, in which at least the number, usually the number and the size of the items vary.

TECHNICAL BACKGROUND

Mail ordering has become a widely used way of buying goods. More and more companies offer virtual department stores, in which the customers can electronically put goods in a shopping cart that later will be transferred by the respective company into a dispatch order. Based on the dispatch order, in a warehouse a shipment set comprising the items ordered and often additional items such as samples, vouchers, invoices, etc. is assembled.

While assembling a shipment set in a warehouse is nowadays often done more or less fully automated, packaging the items to be shipped is still a challenge, in particular when a shipment set comprises several items of different sizes and in different quantities. Often, the items to be packaged are provided automatically to a packaging station, where a number of different cardboard blanks for folding cardboard boxes of different sizes are kept available. A person estimates the size of a box necessary for packaging the respective shipment set, folds the blank into the box and packages the shipment set in the box. Besides the fact that this process is time consuming, persons working at such packaging stations often misjudge the size of a necessary box. If the box turns out to be too big, packaging material is wasted and—as postage often depends at least partially on volume—postage may be unnecessarily increased. If the box turns out to be too small, repackaging the shipment set has to be done and the packaging process is slowed down.

To automate the packaging process even in cases where items forming a shipment set vary in size and number, a system has been proposed in WO 2014/117817 A1 that allows creating a fully custom sized box, i.e. a box, of which width, length and height are adapted to the respective content of the box. The box is created from a roll or a stack of cardboard by cutting out and creasing a custom sized blank from which then the box is folded automatically.

To facilitate obtaining optimized dimensions for a box for packaging a shipment set comprised by a number of items, WO 2016/157089 A1 proposes to arrange and re-arrange the items in a crate with movable sidewalls and a movable bottom until an arrangement with minimized packaging volume is found, to detect the dimensions of a box necessary to hold the arrangement, to cut out a cardboard blank having the dimensions necessary to fold the box, to place the crate with the items on the blank, to open the bottom of the crate to transfer the items onto the blank and to fold the blank around the items to create the box. If an arrangement of items is placed on a blank through the bottom of a crate, the arrangement tends to fall apart and in particular items of cylindrical or spherical shape may roll away.

WO 2016/059218 A1 discloses a system and a method for automatically packaging a shipment set comprised by items varying in size and number applying two separate packings, namely an inner packing surrounding the items to be packaged in a first direction, and an outer packing surrounding the inner packing in a second direction, said second direction being substantially perpendicular to the first direction such that the inner and the outer packing form a combined package enclosing the items from all sides.

WO 2013/117852 A1 and WO 2015/124869 A1 each disclose a system and a method for reducing the height of a cardboard box to the apex of the highest item in the box. If pre-folded boxes are used, of which only the height can be changed, the finished package may not be optimal with respect to volume, while transportation costs often do not only depend on the weight, but also on the volume of a package. As the boxes are packed prior to reducing the height, packing can be inconvenient.

In order to solve some of the above identified problems, it has been proposed by the applicant to use a pre-folded cardboard box to receive one or more items to be packaged, said pre-folded cardboard box having a bottom panel, two side panels and a first end panel, the side panels and the end panel being erected from the bottom panel to form a box having an open top and an open side, the bottom panel having an end portion intended to form a second end panel, each side panel having an end portion intended to form a corner panel. Once the items are placed in the open box, the end portions of the bottom and the side panels are folded to close the open side, and a lid may be placed on the box to close the open top, while the end portions may be shortened prior to folding, which advantageously allows customizing the box in at least one dimension, which dimension is usually referred to as length (sometimes also called depth) and which is defined by the length of the bottom panel between the first and the second end panel. In a preferred embodiment, the panels defining the height of the box (i.e. the length of the respective erected panels in the direction from the bottom panel to the open top of the box) may also be shortened to reduce the height of the box.

US 2014 0 059 981 A1 discloses measuring the actual dimensions of the items to be packaged and creating a custom-sized box based on the measured dimensions.

US 2014 067 104 discloses retrieving information about the dimensions of the items to be packaged from a database and creating a custom-sized box based on the information stored in the database.

SUMMARY

While the known systems and methods work well for a number of applications, it has turned out that there is a need for optimization of the packaging process under a number of aspects. Depending in particular on the number and the shape of the items forming a shipment set to be packaged, creating a custom sized box around the items to be packaged can be difficult. If pre-fold boxes having an open top and an open side are used, it has to be made sure that items assembled in the box do not fall or in particular roll out of the box, which makes it necessary to either tilt the boxes slightly upon assembling the items in the box or to use special devices preventing items from falling/rolling out of such open box. One particular problem associated with the prior art techniques is that information in databases is often outdated and boxes created based on stored information on the items of a dispatch order may lead to boxes that are either to small or to large. This may in particular happen when the items to be packaged are individual packages itself, for example a box holding a bottle of perfume, as the dimensions of such individual packages are sometimes changed by the respective manufacturers without informing the operator of a warehouse, so that information on the size of individual items in the database is not correct. If boxes are created based only on the measured actual dimensions of the items about to be packaged, there is no check that these items are actually the items of a specific dispatch order.

It is an object of the invention to disclose a system and a method, which allow to fully custom size a box, while avoiding the problems associated with the prior art. It is a particular object of the invention to improve the correctness of shipment sets, i.e. to ensure that only the items that according to the respective dispatch order should be shipped (ordered items and additional items such as e.g. invoices or samples) are packaged. It is a further object of the invention to avoid the problems associated with using pre-folded boxes having an open (lateral) side and open top.

The object is achieved by a system according to claim 1 respectively a method according to claim 7. The respective dependent claims refer to advantageous embodiments of the respective independent claims.

According to an embodiment of the invention, a system for automating packaging of varying shipment sets, i.e. sets, in which at least the number, usually the number and the size of the items vary, comprises a control unit for receiving from a database stored information on the size and number of items forming a shipment set according to a dispatch order, an information acquiring device for acquiring current information on the items being actually arranged for said shipment set, said information acquiring device being communicatively coupled with said control unit and said control unit being configured to calculate, either based on the information from said database or from the information acquiring device, the dimensions of a custom sized cardboard box for packaging the shipment set.

The system further comprises a box forming station for forming said custom sized cardboard box having a bottom wall, four side walls and an open top. Such box forming stations that upon receipt of respective dimensioned data create cardboard boxes from cardboard are well known in the art and hence hereinafter not described in detail.

The system further comprises a packaging station for packaging the items for the shipment set into said custom sized cardboard box. At such packaging station, the items are arranged in the box either manually or automatically or semi-automatically, for example a robot may present the items to a person, who arranges the items in a box. Depending on the amount of packages that have to be packaged, the system may comprise more than one packaging station, as it has turned out that arranging the items in the box can be a rather time consuming part in the packaging process.

The system further comprises a lid placing station for closing said custom sized cardboard box with an appropriate lid. As will be explained later, such lid may be formed directly on the filled box or may be formed in advance and then placed on the filled box.

The control unit is configured for performing a verification using the current information from said information acquiring device and the stored information from said database to verify that the actual shipment set is formed according to the dispatch order.

In an advantageous embodiment, the control unit may be configured to create a virtual arrangement of said items and to calculate based on said virtual arrangement the dimensions of a custom sized cardboard box for packaging the shipment set Depending on the situation, in which the system is employed, shipment sets being packaged may only comprise identical items that vary in number, or the shipment sets may comprise items that differ in size and number. Obviously, in some cases a shipment set may be formed of only a single item. Hence, the term "shipment set" comprises shipment sets of one or more identical or different items, for which in each case a custom sized cardboard box is advantageously created, which box can not only be used for packaging the items, but which—as will be explained later—can also be used for collecting the item(s) of the respective shipment set in a warehouse.

As will be explained later, the control unit may receive information on the size and number of the items in different ways and may upon calculating the dimension of the custom sized cardboard box not only take into account the size of the items including their shape, but also additional materials forming part of the shipment set like in particular protective filling material, gifts and additional documents like vouchers and invoices. Hence, the term "shipment set" not only comprises the actual items ordered by a customer, but everything that shall be packaged in the custom sized box.

Acquiring current information on the items being actually arranged for said shipment set will typically comprise acquiring the overall dimensions of all the items in the arrangement, i.e. the actual maximum length, actual maximum width and actual maximum height of the arrangement, which determine the minimum inner length, width and height of a box capable of housing the arrangement. It may also comprise acquiring the actual size of individual items in the actual shipment set.

A method for automating packaging of varying shipment sets according to one embodiment of the invention comprises obtaining from a database stored information on the size and number of items forming a shipment set according to a dispatch order, obtaining via an information acquiring device current information on the items being actually arranged for said shipment set, calculating, either based on the information obtained from said database or on the information obtained from the information acquiring device, the dimensions of a custom sized cardboard box for packaging said shipment set, forming said custom sized cardboard box having a bottom wall, four side walls and an open top, verifying using said information obtained from said database and the information obtained from the information acquiring device that the actual shipment set is formed according to the dispatch order and, if the verification is positive, packaging the items forming the shipment set into said custom sized cardboard box, and closing said box with an appropriate lid. For calculating the box dimensions, a virtual arrangement of the items forming the shipment set may be calculated.

Further objects, features and advantages of the invention will become apparent from the following non-limiting description of preferred embodiments in conjunction with the accompanying drawings.

DETAILED DESCRIPTION OF PREFERRED EMBODIMENTS

Figure 1:
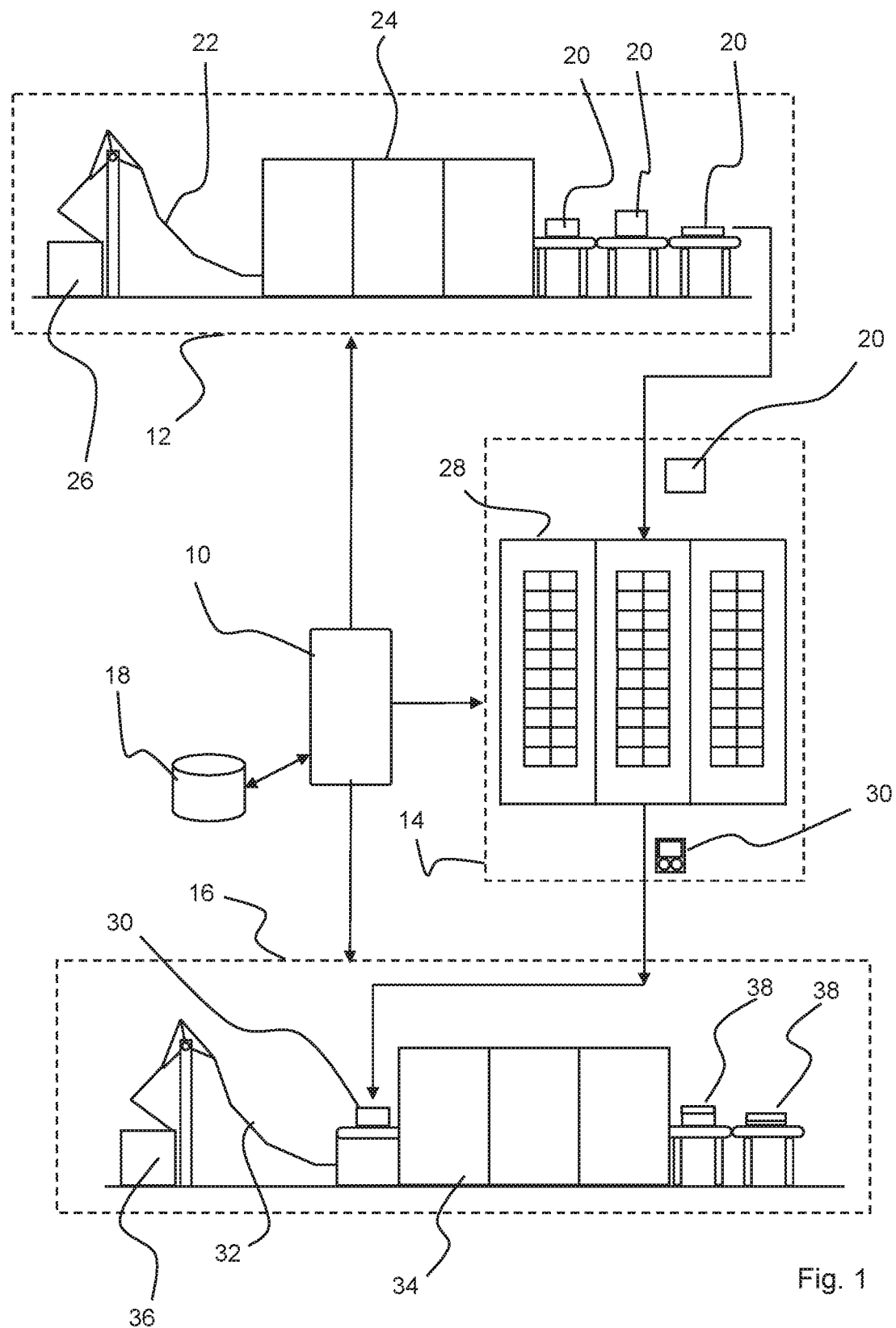
FIG. 1 is a schematic diagram of a system for automating the packaging of varying shipment sets.

FIG. 1 is a schematic diagram of a system for automating the packaging of varying shipment sets and comprises a control unit 10, a box forming station 12, a packaging station 14 and a lid placing station 16. Control unit 10 performs different tasks, such as calculating box dimensions for a cardboard box for a specific shipment set, controlling the box forming station 12, controlling the packaging station 14 and controlling the lid placing station 16.

Control unit 10 is communicatively coupled with a database 18 holding dispatch order information and information on the size and typically also on the weight of individual items, as weight might also be taken into account upon calculating box dimensions. Control unit 10 receives information about the size and the number of items forming a specific shipment set from the database 18. Based on the information retrieved from the database on the number and the size of the items forming a specific shipment set, control unit 10 calculates box dimension and respective custom sized boxes 20 are created at the box forming station 12.

Box forming station 12 is a station for forming cardboard boxes from zig-zag folded cardboard 22 that in a manner known per se is supplied to a cutting, creasing and folding unit 24 from a cardboard stack 26. As schematically shown, the created boxes 20 vary in size, and their dimensions are customized for a specific shipment set.

The boxes are transported to packaging station 14, which includes item storage 28, where the boxes are used for manually or automatically collecting the items of the specific shipment set, for which the respective box has been custom sized. The items are arranged in the respective box, either upon collecting or at a special station not shown, leading to a box 30 filled with items. The storage 28 as well as the other stations and units of the shown system may be part of a warehouse.

Each filled box 30 is then transported, typically fully automatically, to lid placing station 16, which operates similarly to box forming station 12 and hence acts as a lid forming station. Lid placing station 16 receives information on a custom sized lid for closing a respective custom sized box from control unit 10. Like the boxes, the lids are created from zig-zag folded corrugated cardboard 32 provided to a cutting, creasing, folding and lid positioning machine 34 from a cardboard stack 36. In the machine 34, the lids created are placed on top of filled boxes 30 and are affixed to the boxes typically by a closing tape or by glue, hence leading to closed packages 38.

Figure 2:
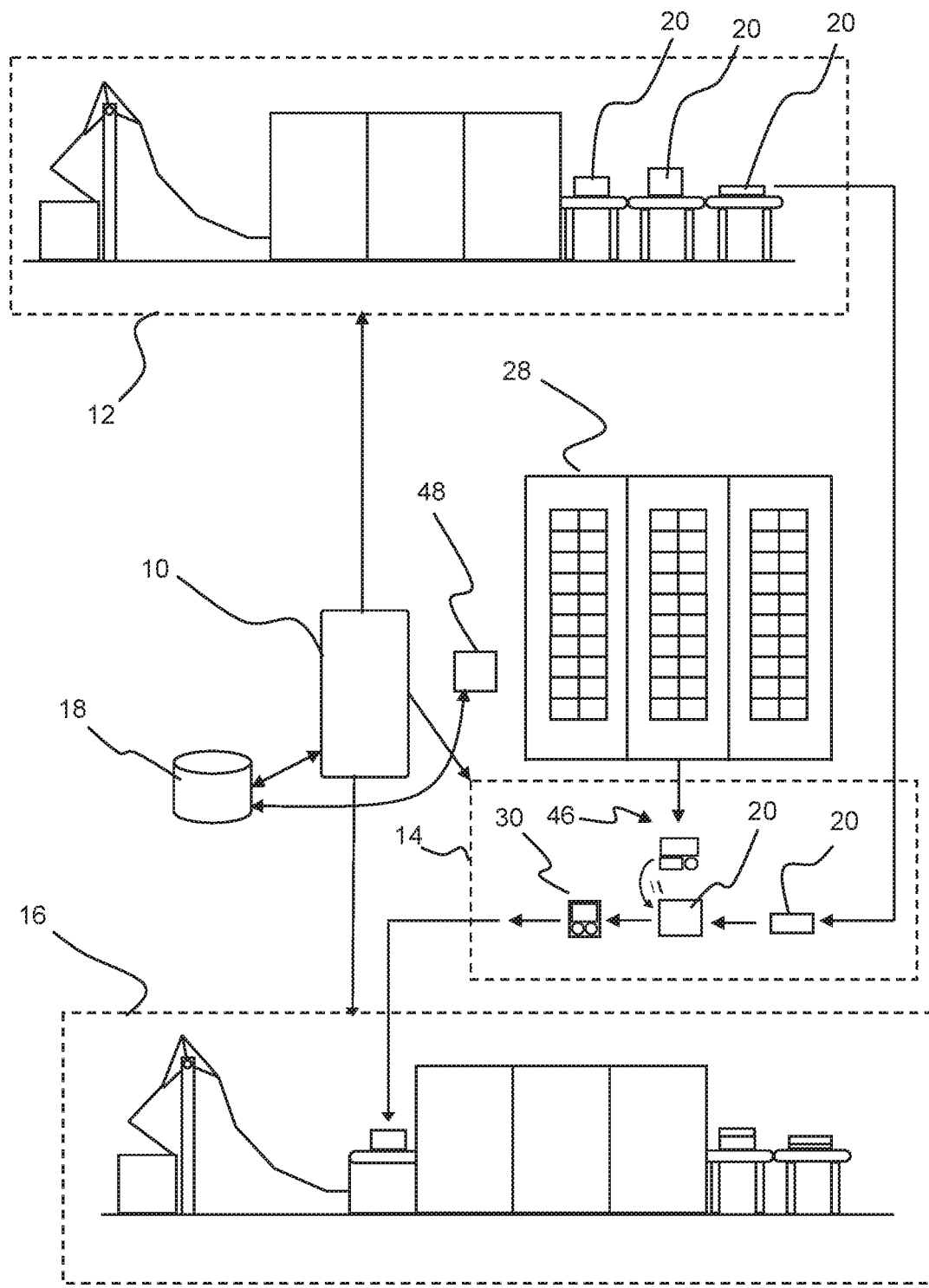
FIG. 2 is a schematic diagram of another system for automating the packaging of varying shipment sets.

FIG. 2 is a schematic diagram of another system for automating the packaging of varying shipment sets. Again, the system comprises a control unit 10, a box forming station 12, a packaging station 14, and a lid placing station 16. Control unit 10 has access to a database 18. In contrast to the system shown in FIG. 1, the custom sized boxes 20 formed at box forming station 12 are directly transported to a packaging station 14, where a respective arrangement of items forming a shipment set 46 is packaged into the respective box, hence leading again to filled boxes 30 that are then transported to lid placing station 16.

Assembling the shipment set 46 in this embodiment is not done directly in the respective custom sized boxes, but the items are taken in another suitable manner out of item storage 28. This may again be done manually or automatically, and a device 48 such as a printer or a monitor for printing respectively displaying a respective dispatch order may be communicatively coupled with database 18, stored on one or more nontransitory processor-readable medium, either directly or via control unit 10, so that for example a human order picker could print out or view a dispatch order and assemble the shipment set 46 for being packaged at the packaging station 14. The device 48 or a separate monitor (not shown) at the packaging station 14 may be foreseen to give packaging instructions for example on how items forming a shipment set should be arranged in the respective box and/or if some items should receive a special protective cover upon packaging, like for example an air bubble wrap.

Figure 3:
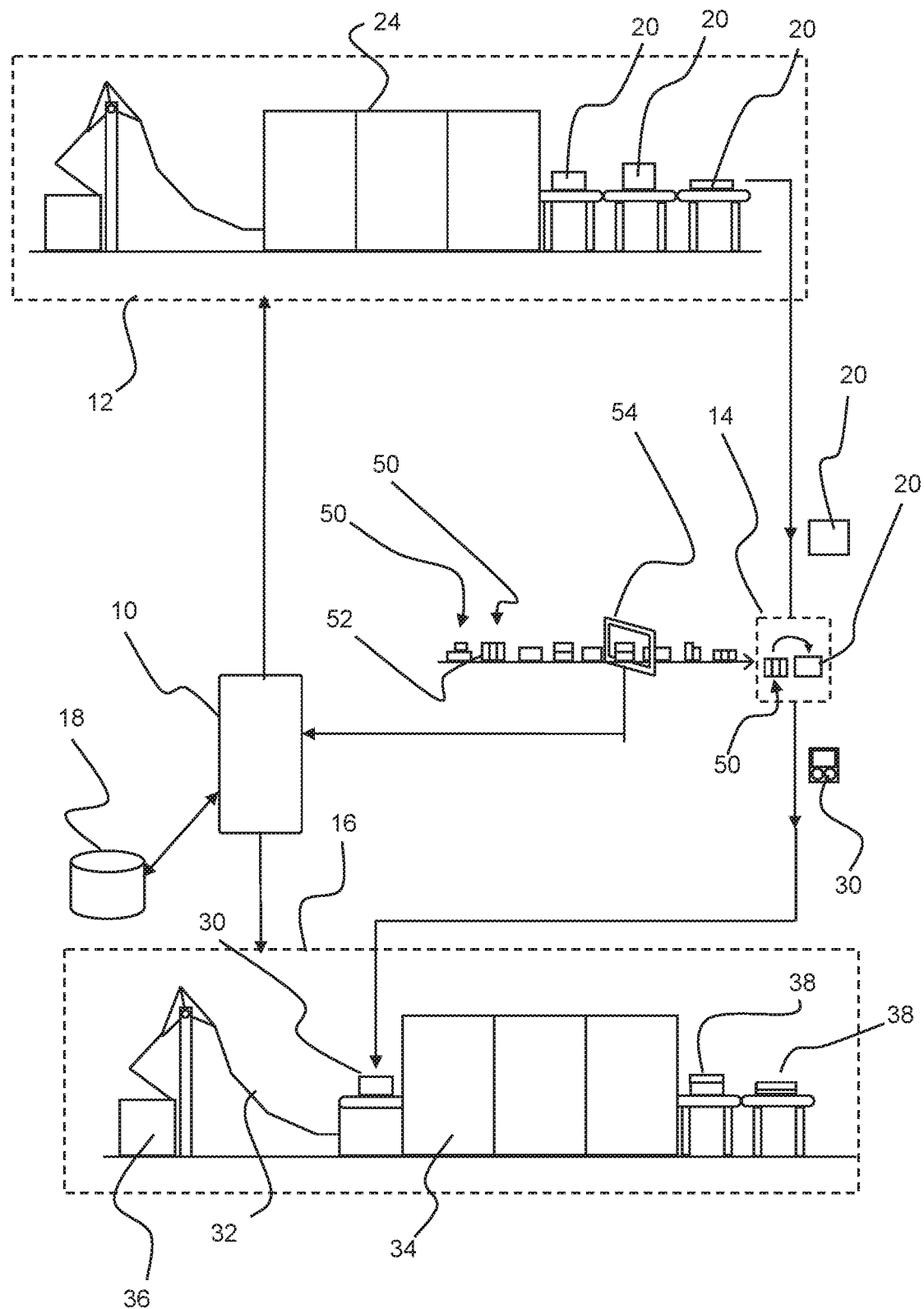
FIG. 3 is a schematic diagram of a system according to an embodiment of the invention.

FIG. 3 shows schematically a system according to a preferred embodiment of the invention, comprising a control unit 10, a box forming station 12, a packaging station 14, a lid placing station 16 and a database 18. In this embodiment, database 18 is not the sole source of information on an arrangement of a items forming a shipment set 50, but arrangements of items forming shipment sets 50 (of which only some are provided with reference numbers) are assembled at a schematically indicated assembly line 52 (which may be a conveyor belt coming from a storage) and are scanned by an information acquiring device 54, which is communicatively coupled with the control unit 10, prior to being transported to packaging station 14.

It is apparent from the teaching herein that the control unit 10, although shown as a single unit, may in fact be a complex system of several units, each comprising corresponding hardware like a microprocessor and each performing different tasks, such as for example calculating box dimensions for a cardboard box for a specific shipment set, controlling the box forming station 12, controlling the packaging station 14 and controlling the lid placing station 16. In some embodiments, the control unit may control each of said stations. In other embodiments, the control unit may only calculate the box dimensions and may communicate the necessary dimensions to a box forming station having its own control unit. The control unit may include one or more microprocessors, microcontrollers, non-volatile memory, volatile memory, magnetic or optical spinning storage media, Flash memory, etc. The control unit is communicatively coupled to one or more actuators, for example one or more solenoids, electrical motors, or relay switches, which operate, for example, one or more drive rollers, driven platens, conveyors, printers, printheads, cutters, blades, knifes, cutting heads, creasers, folders, pickers, grippers, positioners, adhesive dispensers, heaters, and, or sources of electromagnetic energy (e.g., ultraviolet light source for instance UV LEDs).

Likewise, instead of a single database 18, the dispatch order and information on the sizes of items in that dispatch order may be stored in different databases and may be provided to the control unit in numerous ways. For example, the control unit may be coupled with a remote order station, which receives orders from customers or in which a customer may directly input his order.

Information acquiring device 54 may comprise an RFID scanner, if the items are provided with respective RFID tags, a barcode scanner, if the items are provided with barcodes, a camera, a length measuring device which sequentially measures length, width and height of an arrangement of the items of a shipment set 50 on the assembly line or a so called 3D dimension measuring device which simultaneously obtains information on the dimensions of the items in an assembly. As is apparent from the teaching herein, if a camera is used, images taken by such camera can be processed to obtain the required information on the dimensions of the items to be packaged. Multiple images may be taken to acquire 3D image information.

With the information obtained by the information acquiring device 54, information about each shipment set 50 is available from two sources, data base 18 and information acquiring device 54, and can be used in different advantageous ways. For example, it is possible to calculate the dimensions of a box for a specific shipment set on the basis of the data stored in the database 18, namely on the information on the number and the size of the items forming the specific shipment set. Control unit 10 may, in a manner known per se, create a virtual arrangement of the items forming the shipment set and may calculate the dimensions of a custom sized cardboard box needed for packaging the shipment set arranged according to the virtual arrangement. In creating the virtual arrangement, the control unit may take into account different optimization criteria as known in the art. For example, the control unit may optimize the box with respect to amount of cardboard used for and/or amount of cardboard wasted upon creating the box at the box forming station, volume of the box, postage, amount of unused space in the box, presence of unwanted folds (if the box forming station uses zig-zag folded cardboard, which hence comprises transversal folds that may interfere with folds for folding a box; the position of such unwanted folds may be known or may be detected and communicated to the control unit). The control unit may also take into account additional items that have not been ordered by a customer but that shall be integrated in the shipment set, like shock absorbing material, gifts, vouchers, documents like invoices etc. The control unit may even generate special packaging instructions on how items forming a shipment set should be arranged in the calculated box and/or if some items should receive a special protective cover upon packaging, like for example an air bubble wrap. Such instructions and/or the virtual arrangement may, in particular if the packaging is done manually, be displayed on a displaying device (not shown) at the packaging station 14.

If the box dimensions are calculated on the basis of the data retrieved from data base 18, the information acquired by the information acquiring device 54 may be used to verify that the actual shipment set 50 is complete, correctly arranged and suitable for being packaged in the respective box created for that shipment set. Depending on the type of information acquiring device 54 used, this verification may for example simple relate to the overall dimensions of the actual shipment set and may compare those dimensions, i.e. the actual maximum length, actual maximum width and actual maximum height of the arrangement of items with the inner length, width and height of the box created for this arrangement. If the information acquiring device comprises a device like an RFID scanner allowing identification of individual items, the verification may comprise comparing the items in an actual arrangement with the items according to the respective dispatch order. In any case, if the verification leads to detecting any deviation between the information acquired by the information acquiring device 54 and the information obtained from the database respectively calculated by the control unit for forming a box, a signal may be generated causing e.g. that the arrangement of the items of a shipment set 50 is set aside for a human review. For such review, a diverting unit such as diverting unit 60 described below in conjunction with FIG. 4 may be provided. One cause of the deviation may be that simply the wrong, i.e. not the ordered items or the correct items but in a wrong number have been picked for the assembly. Another possible cause lies in the fact that sometimes items to be packaged already have an individual package and that the dimensions of such individual packages sometimes are changed by the respective manufacturers without informing the operator of a warehouse, so that information on the size of individual items in the database 18 may be outdated. Hence, it may be foreseen that information obtained the information acquiring device 54 is also used to update entries in database 18. Note that there may be substantial deviations, which require checking the shipment set for completeness/correctness or even creating a new box, and minor deviations such as small deviations in the size, which require no action at all.

As is apparent from the present disclosure, the information obtained by the information acquiring device and the information obtained from the database may also be used "the other way round", i.e. in contrast to the above described way the information obtained from the information acquiring unit 54 may be used to calculate the dimensions of a box for a specific shipment set and the information obtained from the database may be used for the verification.

If the verification is done and no substantial deviation is detected, each filled box 30 is then transported, typically fully automatically, to lid placing station 16, which operates similarly to box forming station 12 as described above in conjunction with FIG. 1 In the shown embodiment, lid placing station 16 receives information on a custom sized lid for closing a respective custom sized box from control unit 10. Like the boxes, in this embodiment also the lids are created from zig-zag folded corrugated cardboard 32 provided to a cutting, creasing, folding and lid positioning machine 34 from a cardboard stack 36. In the machine 34, the lids created are placed on top of filled boxes 30 and are affixed to the boxes typically by a closing tape or by glue, hence leading to closed packages 38. As is apparent from the teaching herein, machine 34 may comprise devices such as printers for printing postage and/or information on the addressee and/or the sender of the respective package on the lid. Likewise, unit 24 used for forming the boxes may be provided with such a device to print on the box resp. on the cardboard prior to forming a box. Such devices may also be provided at separate stations.

Machine 34 may also include document feeders for putting documents like invoices and delivery notes into the filled boxes 30 prior to closing the boxes. Again, such document feeders may also be provided separately, for example at the packaging station 14 or along a transport path between the packaging station 14 and lid placing station 16.

Figure 4:
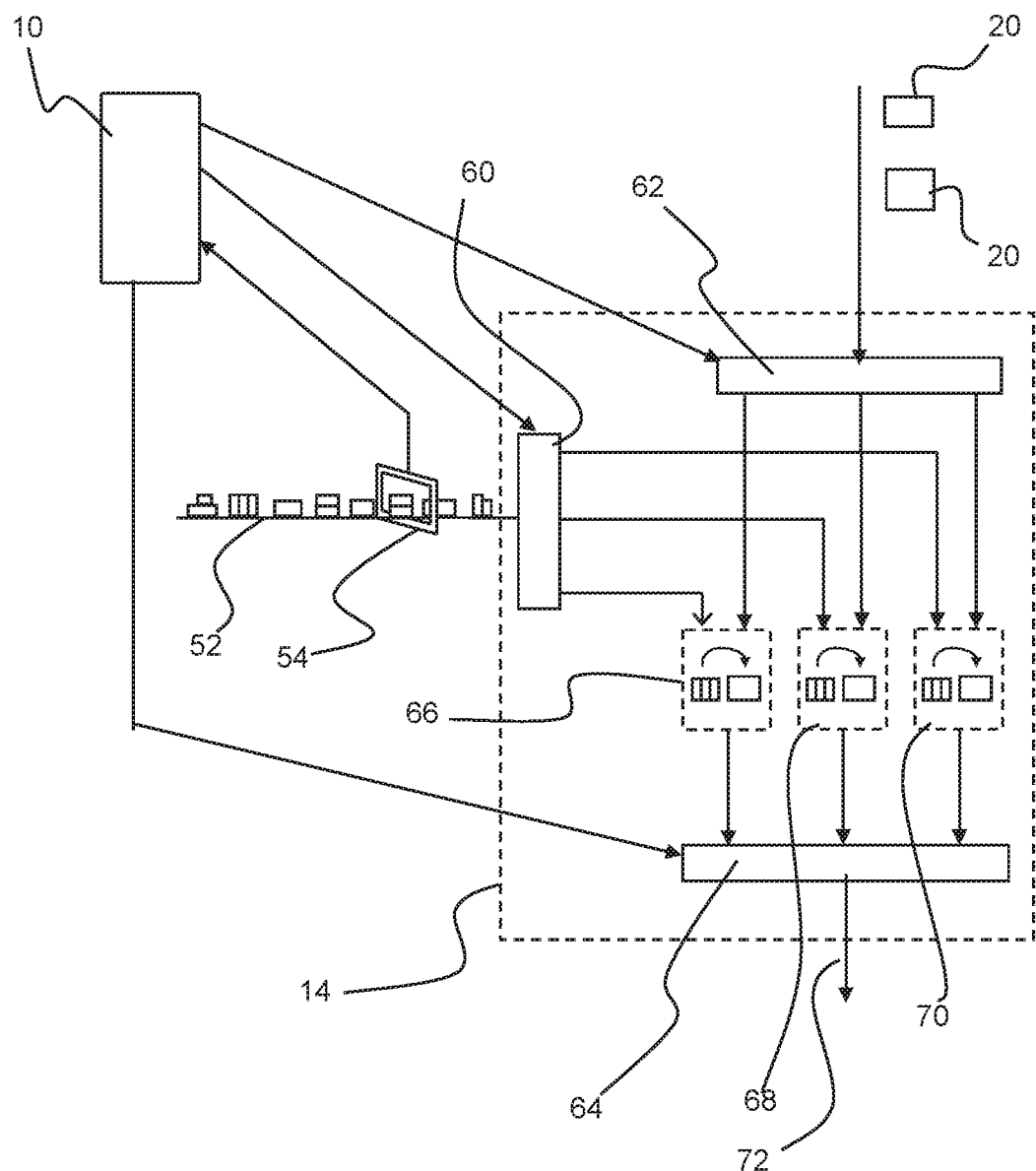
FIG. 4 is a schematic diagram of certain details of a system according to another embodiment of the invention.

FIG. 4 shows details of a system similar to the system shown in FIG. 3, again comprising a control unit 10 and an information acquiring device 54 communicatively coupled with control unit 10. The packaging station 14 in this example comprises two diverting units 60 and 62 and one joining unit 64. As arranging the items of a shipment set in a respective custom sized box can sometimes be time consuming, the arrangement of items on the arrangement line 52 are diverted by diverting unit 60 to three different packaging substation stations 66, 68, 70. Likewise, custom sized boxes 20 arriving at diverting unit 62 from a box forming station are diverted and fed to the respective packaging substations so that packaging can be done in parallel at the stations 66, 68, 70.

In order to ensure that a box custom sized for a specific set of items is directed to the same packaging station as the set of items, control unit 10 in this embodiment controls both diverting units 60 and 62. At the end of the packaging process, the filled boxes put on a single transportation line 72 via joining unit 64, and are fed to a lid placing station like the one shown in FIG. 3. Again, as explained above the separate units and stations may be controlled by control unit 10 or by separate control units. As mentioned above, diverting unit 60 may also be used to divert shipment sets, for which the verification has failed and which need to be inspected.

In particular when the items are arranged in the custom sized box manually and at different packaging stations or, when a custom sized box is used as shown in FIG. 1 already for collecting the items from a storage in a warehouse, it has to be ensured that the lid placing station has the correct information about the size of the box, i.e. about the dimensions of the opening of the box, so that an appropriate lid could be placed for closing the box. In order to obtain this information, the lid placing station may be provided with an information acquiring device similar to device 54 shown in FIGS. 3 and 4, which could measure the size of the box respectively of the opening to be closed by the lid or read information provided on the box or on a device transporting the box. In a preferred embodiment, the system comprises a box marking unit for providing a machine readable identifier for the custom sized cardboard box and attaching this identifier either to the box or to a device such as a tray for transporting the box. The identifier may be permanently or temporarily attached to the box or the transporting device and may be a printing, a barcode, an RFID tag, a label or an order sheet. Depending on the individual arrangement of the system, the user may choose advantageously the type of identifier best suited for the arrangement. Obviously, the identifier may already be attached to cardboard upon forming the custom sized boxes or attached to a box after the box has been folded. Likewise, it may be provided on a tray, a trolley or a similar device which is used for transporting the box from box a forming station to a packaging station and/or from a packaging station to a lid placing station. With such identifier, the lid placing station and/or a lid forming station can obtain the necessary information on the box size from a respective data base respectively from the control unit.

The invention claimed is:

1. A system for automating packaging of varying shipment sets, comprising:
   a control unit for receiving from a database stored information on the size of items and the number of items forming a shipment set according to a dispatch order, said number of items being two or more,
   an information acquiring device for acquiring current information on the items being actually arranged for said shipment set, said information acquiring device being communicatively coupled with said control unit and said control unit being configured to calculate, either based on the stored information from said database or based on the current information from the information acquiring device, the dimensions of a custom sized cardboard box for packaging the shipment set,
   a box forming station for forming said custom sized cardboard box having a bottom wall, four side walls and an open top,
   a first packaging station and a second packaging station for packaging the items forming the shipment set into said custom sized cardboard box,
   a diverting unit which diverts said shipment set to one of a plurality of destinations, wherein the plurality of destinations includes the first packaging station and the second packaging station,
   a lid placing station for closing said custom sized cardboard box with an appropriate lid, and
   a joining unit that receives packaged shipment sets from both the first packaging station and the second packaging station and places the packaged shipment sets onto a single transportation line, which carries the packaged shipment sets to the lid placing station,
   wherein said control unit is configured for performing a verification by determining a deviation between said current information on the items actually arranged for said shipment set and the stored information on said size of items and said number of items forming said shipment set according to the dispatch order from said database to verify that the shipment set is formed according to the dispatch order.

2. The system according to claim 1, further comprising at least a positioning device for gripping the items forming the shipment set and placing the items in the custom sized cardboard box.

3. The system according to claim 1, wherein said information acquiring device comprises at least one of: a barcode scanner, an RFID scanner, a camera, a data base with at least one of item information and dispatch order information, a length measuring device, and a 3D measuring device.

4. The system according to claim 1, further comprising a box marking unit providing a machine readable identifier for the custom sized cardboard box, said machine readable identifier permanently or temporarily attached to the custom sized cardboard box or to a device for transporting the custom sized cardboard box.

5. The system according to claim 1, further comprising a displaying device at said first packaging station or said second packaging station for providing instructions on arranging the items in said custom sized cardboard box.

6. The system according to claim 1, further comprising a lid forming station for forming a custom sized lid for said custom sized cardboard box.

7. The system according to claim 1 wherein in response to a failure to verify that the shipment set is formed according to the dispatch order the diverting unit diverts the shipment set to be set aside for human review.

8. The system according to claim 1 wherein the system includes a third packaging station, and the plurality of destinations includes the third packaging station.

9. The system according to claim 1 wherein the diverting unit is a first diverting unit, the system further comprising:
   a second diverting unit which in a first orientation diverts said custom sized cardboard box to one of the plurality of destinations, and in a second orientation diverts said custom sized cardboard box to another of the plurality of destinations.

10. The system according to claim 1, further comprising:
    an assembly line upon which the shipment set is assembled and then transported to the information acquiring device.

* * * * *